March 11, 1941.   J. P. CERVENY ET AL   2,234,895
OSCILLATOR TUBE RELAY CONTROL
Filed March 1, 1939   2 Sheets-Sheet 1
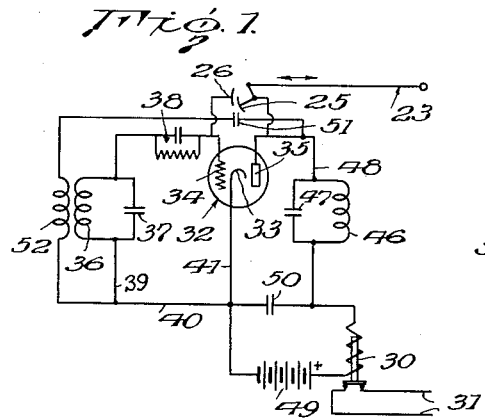
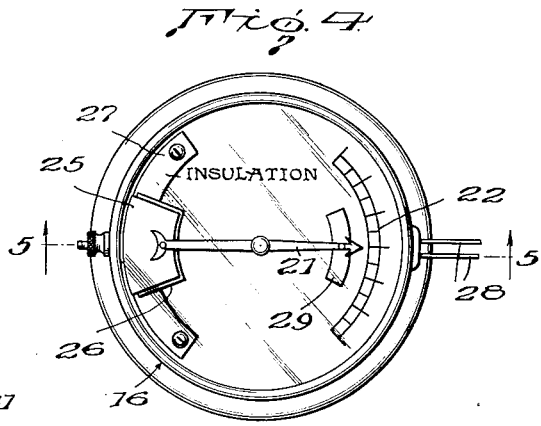
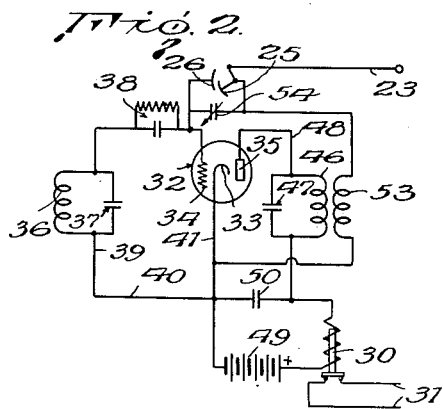
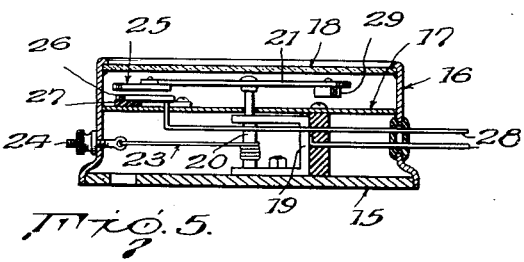
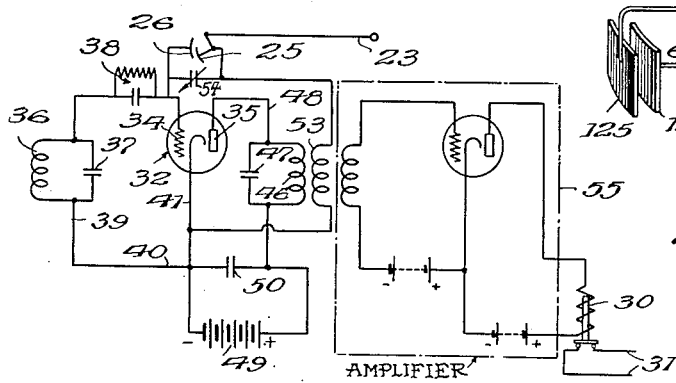
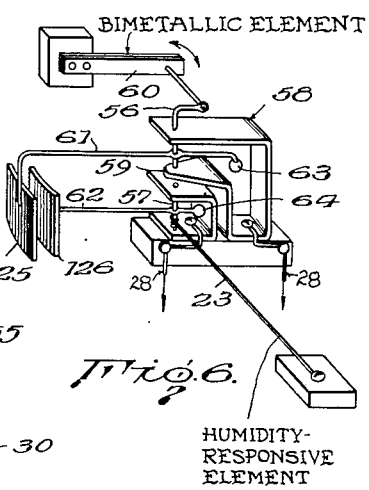
Inventors
James P. Cerveny
William F. Priest
By A. M. Houghton
Their Attorney March 11, 1941.　　J. P. CERVENY ET AL　　2,234,895

OSCILLATOR TUBE RELAY CONTROL

Filed March 1, 1939　　　2 Sheets-Sheet 2

Inventors
James P. Cerveny
William F. Priest
By A. M. Houghton
their Attorney

Patented Mar. 11, 1941

2,234,895

UNITED STATES PATENT OFFICE 2,234,895

OSCILLATOR TUBE RELAY CONTROL

James P. Cerveny, Yakima, and William F. Priest, Rosalia, Wash.

Application March 1, 1939, Serial No. 259,274

8 Claims. (Cl. 175—320)

This invention or discovery relates to controllers; and it comprises relay control apparatus for operating relatively heavy mechanism under control of a relatively weak or delicate indicating device, and comprising an oscillator which includes a tube having a cathode, grid and plate, a tuned circuit connecting the grid and the cathode and a tuned circuit connecting the plate and the cathode, and arranged for regenerative feed-back of energy from the plate circuit to the grid circuit; a circuit connecting the grid and plate circuits for neutralizing said regenerative feed-back; a variable element arranged to affect feed-back of energy from the plate circuit to the grid circuit; means responsive to fluctuations in a physical condition, for actuating said element; and electrically operable mechanical means arranged to be operated by a current in the oscillator circuit all as more fully hereinafter set forth and as claimed.

It is often desired to control a switch for an electric power circuit, according to variations in temperature, humidity, and other variable physical conditions. For example, in an electric heating system, it may be desired to switch the heating current on and off accordingly as the temperature falls or rises, by means of a thermostat or the like. Since thermostats, thermometers, hygrometers and like measuring instruments are ordinarily incapable of supplying more than very small mechanical effort, there is a problem in adapting them to actuate the necessarily relatively heavy switching mechanism. Various relay systems have been proposed for meeting this problem, and some have gone into use.

Among the objects achieved in the present invention is the provision of a relay system, of a vacuum tube type, adapted to actuate a switch according to the response of a thermostat, hygrometer or other indicating or measuring instrument, and characterized by employing a neutralized, feed-back vacuum tube oscillator having tuned grid and plate circuits and of extreme sensitivity, the functioning of the oscillator being controlled by the measuring instrument, and the oscillator in turn controlling a switch or the like.

Another object is the provision of such a system, in which the measuring instrument is arranged to change a constant (e. g., resistance, capacitance or inductance) of the neutralized oscillator in a frictionless manner, and in so disturbing the neutralization of the oscillator, to cause the oscillator to oscillate or to cease oscillating; thereby abruptly changing the currents flowing therein and operating the switch.

Other objects include the provision of a controller of the electronic relay type embodying an oscillator so constructed that moderate voltage fluctuations in the power supply for the oscillator will not appreciably affect the operation or the sensitivity of the circuit; the provision of a controller of the type described which can be operated by any suitable form of electrical power including alternating current; and the provision of a relay with an actuating oscillator of such character that oscillations, when once initiated, are prevented from causing chattering of the relay.

These and other objects are achieved by the provision of a controller which includes three main components or units in combination: (1) an oscillator having a vacuum tube, a cathode circuit and tuned grid and plate circuits for the tube, the oscillator being arranged for regenerative feed-back of energy from the plate circuit to the grid and for neutralization of such feed-back; (2) means responsive to a physical condition (e. g. a thermostat or hygrometer) and arranged to alter the character of the energy fed back to the grid, so as to shift the oscillator back and forth from an oscillatory to a non-oscillatory state; and (3) a solenoid switch, or other power-consuming device, operated by current developed in some part of the oscillator. The currents flowing in the oscillator have widely different values depending on whether the oscillator is oscillating or is not oscillating and the electromagnetic switch or other device to be operated is connected into the plate circuit; or, if desired, into the grid circuit or the cathode circuit, for operation by such currents.

As stated, means are provided whereby the circuit can be adjusted to neutralization; in which condition it is very sensitive to changes in any of the circuit constants (resistance, capacitance or inductance). In one embodiment the inherent plate-to-grid capacity of the tube serves for regenerative feed-back of energy, which would normally sustain oscillations in the circuit; and in this embodiment an adjustable neutralizing circuit is provided. In another embodiment an exterior regenerative feed-back circuit is provided, and in such embodiment either this feed-back circuit or the neutralizing circuit is made adjustable. In either case, the hygrometer or other measuring instrument is arranged to change one of the circuit constants, upon change in humidity or other variable to which the instrument responds, and in so doing, to deneutralize the circuit and thereby throw the circuit into oscillations. With proper adjustment, a very small signal or movement of the measuring instrument suffices to disturb the resonant balance between the neutralizing and feed-back circuits, and to throw the circuit into or out of the oscillating state, and thus to control the switch. Extremely sensitive control is readily secured. For example, in a practical working embodiment of the invention as a thermostatic temperature control for heaters, the temperature has been controlled to within 0.005 degree centigrade. An advantageous practical feature of the invention is that the circuit constants required for neutralization are not affected to any appreciable degree by fluctuations in the supply voltages. The circuit of the invention is like a bridge circuit in this respect; the balance point does not change when the applied voltage is changed. The tuning of the grid and plate circuits remains fixed; it is not affected during the functioning of the circuit to turn the switch on and off, etc.

The apparatus is capable of wide application, wherever it is desired to cause a relatively weak or delicate mechanical movement or electrical fluctuation, to accurately control a relatively heavy mechanical device, such as a switch or the like. The functioning of the apparatus in typical utilizations will be clear from the extended description to follow.

In the accompanying drawings there are shown diagrammatically several specific examples of embodiments of apparatus within the purview of the invention. In the drawings—

Fig. 1 is a circuit diagram of one form of controller, having a variable regenerative feed-back circuit.

Fig. 2 is a diagram of a modified form of controller, having a variable neutralizing circuit.

Fig. 3 shows the apparatus of Fig. 2 with an added stage of amplification.

Figs. 4 and 5 are views in plan and vertical central section respectively of a hygrometer adapted for use in the invention.

Fig. 6 is a perspective view of a combined hygrostat and thermostat useful in the invention.

Figure 7:
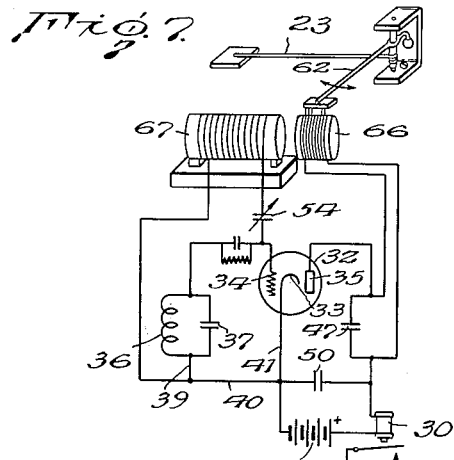
Fig. 7 is a view illustrating control of an oscillator by varying an inductance therein.

The control system of the invention is as stated applicable to all kinds of devices responsive to various physical conditions, but for the sake of simplicity will be described mainly in connection with hygrometers (devices responsive to changes in atmospheric humidity) and thermostats (bimetallic elements arranged to warp or bend under the influence of temperature changes).

In the drawings, in which like reference characters indicate like parts, Figs. 4 and 5 show a form of hygrometer adapted for use in the invention, and Figs. 1, 2 and 3 show it connected into the oscillator circuit for operating a relay. Fig. 4 shows the hygrometer in plan, and Fig. 5 is a vertical section taken along line 5—5 of Fig. 5 with some parts shown in elevation. The hygrometer comprises a base 15, a case 16 secured to the base, a dial 17 suitably mounted in the case and covered by a glass cover 18, a frame 19 fixedly secured in the case and provided with a movable member or shaft 20, rotatably mounted therein, at the upper end of which is mounted a pointer 21 adapted to register with graduations 22 on dial 17, to indicate values of humidity. A horse hair 23 or other medium susceptible to expansion and contraction under humidity changes is wrapped around and secured at one end to said movable member 20 and at its other end to an adjusting screw or post 24 mounted in the case.

The needle (21) has a movable metal condenser plate 25 attached to one end thereof, the movable plate being opposed to a stationary plate 26, insulated from the case by insulation 27. Connections are made to the two plates by leads 28, as shown. A counterweight 29 is attached to the other end of the needle. Upon swinging of the needle, the effective capacitance of condenser 25, 26 is varied. The provision of the condenser imposes no frictional resistance on the hygrometer. The more massive parts of the apparatus, elements 15, 16 and 17, are advantageously made of non-metallic material such as molded synthetic resins, so as not to interfere with the action of the condenser plates.

Fig. 1 shows one form of controller wherein the hygrometer is arranged to operate an electromagnetic (solenoid) relay switch 30 in a power circuit 31 which in turn may control heating coils, etc., not shown. The control circuit comprises a triode vacuum tube 32, having a cathode 33, grid 34 and plate 35, as shown. The grid circuit includes an inductance 36 and capacitance 37 in parallel as shown, and a grid-leak-and-condenser combination 38, arranged in series with 36, 37 as shown, and connecting the grid with the cathode through leads 39, 40 and 41. The plate circuit includes an inductance 46 and capacitance 47 in parallel connected to the plate through a lead 48, and in series with the solenoid switch (30), a B-battery 49, and lead 41, as shown. A condenser 50 is connected across the solenoid as shown, as by bypass for the oscillating frequency around the relay and the power supply.

Condenser plates 25 and 26 (Fig. 5) are arranged in circuit as shown diagrammatically in Fig. 1, between the plate and the grid. The grid inductance-capacitance combination 36, 37 is tuned to the same frequency as the plate combination 46, 47, and the circuit as so far described would normally oscillate, the regenerative feed-back energy to sustain oscillation being transferred from the plate circuit to the grid circuit through the condenser 25, 26. The tube is maintained at the proper operating bias by the grid leak resistance and condenser 38, whereby a decrease in plate current occurs when the circuit becomes oscillatory, and an increase when the circuit goes out of the oscillating state. Feedback is neutralized by a circuit comprising a capacitance 51 and inductance 52 coupling the plate circuit with the grid circuit, in the manner shown. The values of 51 and 52 are selected so that, at the normal position of condenser 25, 26 the oscillator just fails to oscillate; is barely stable.

Considering the operation of the system of Fig. 1; the circuit is adjusted, as stated, to be non-oscillating but just on the point of going into oscillations. Under these conditions a strong plate current flows, keeping solenoid switch 30 open. Upon movement of the hygrometer needle, the capacitance of condenser 25, 26 is changed, thus changing the feed-back energy supplied from the plate circuit to the grid circuit through 25, 26, and the oscillatory circuit becomes un-neutralized and goes into oscillations. The plate current drops sharply, and switch 30 closes. The action of the oscillator circuit is very clean and sharp, by virtue of the tuned grid and tuned plate circuits. By suitable adjustment of the various circuit elements, the oscillatory circuit can be made exceedingly sensitive, so as to respond to a very small displacement of condenser plates 25, 26. The balance point of the oscillator can be put at the middle of the condenser adjustment, that is, so that the normal stable state of the oscillator occurs when the condenser plates are in the position shown in Fig. 4; or it can be put at either end of the condenser adjustment, that is, with plate 25 barely overlapping plate 26, as by mounting plate 26 at a different angular location on support 27 (Fig. 4).

When energy is transferred from the output circuit (plate circuit) to the input circuit (grid circuit) of a vacuum tube oscillator, this is known as feed-back. Feed-back may be of such character either (1) to tend to make the oscillator oscillate, or (2) to tend to stabilize the oscillator, that is to prevent oscillations. In case (1), the feed-back is termed regenerative feed-back and in case (2) it is termed neutralization or neutralizing feed-back. All tubes have some inherent internal regenerative feed-back tending to make the tube oscillate, existing by virtue of the inherent plate-to-grid capacitance of the tube; though in tubes of the screen-grid type the internal feed-back is reduced to a very low value. Neutralization must overcome this internal feed-back and also overcome the feed-back of exterior regenerative feed-back circuits if such are provided. For neutralization, feed-back of energy in the right amount and phase is required. In the circuits utilized in the present invention, when there is a certain amount of feed-back (supplied either by an exterior circuit or by the internal feed-back of vacuum tubes) and just the right degree of neutralization to make the circuit stable, then any change in the feed-back makes the circuit less stable and eventually results in oscillation. As stated, either the regenerative feed-back or the neutralization can be adjusted. (The tuning of the grid and plate circuits remains unchanged during such adjustment.) In Fig. 1, as described, an external regenerative feed-back circuit and a neutralizing circuit therefor are provided. The neutralizing circuit, once adjusted initially, remains fixed, and the regenerative feed-back circuit is varied under the demand of the thermostat, etc. In Fig. 2 no separate regenerative feed-back circuit is provided. The inherent capacitance of the tube is relied upon for regenerative feed-back of energy. This internal feed-back is naturally fixed and is beyond control, being within the tube so to speak. A neutralizing circuit is provided for this feed-back, which is varied under demand of the thermostat, etc. Referring to Fig. 2, the neutralizing circuit comprises an inductance 53, in coupling relation with coil 46, and in series with a variable or adjustable condenser 54. The circuit feeds energy back from the plate circuit to the grid circuit, of such character as to neutralize the inherent regenerative feed-back due to the plate-to-grid capacitance of the tube. Condenser 25, 26 is connected in parallel with condenser 54, and upon being varied by the hygrometer etc. de-neutralizes the circuit and thereby permits oscillation to take place.

To recapitulate: in both embodiments shown in Figs. 1 and 2, the oscillator depends on regenerative feed-back for sustaining oscillations, and in both embodiments the regenerative feed-back is normally neutralized by a neutralizing circuit. In Fig. 1, the neutralizing circuit is fixed and the regenerative feed-back circuit is varied to initiate or stop oscillations, while in Fig. 2 the regenerative feed-back is fixed, being an inherent property of the tube, and the neutralizing circuit is varied. In all cases the neutralizing circuit feeds back energy of such character as to neutralize the regenerative feed-back energy, and thus to prevent oscillations until the feed-back relations are changed by the hygrometer etc.

If it is desired to operate very heavy switches or other mechanism requiring a good deal of energy for operation thereof, it is advantageous to amplify the plate current of the oscillatory circuit. Fig. 3 shows the circuit of Fig. 2, in combination with an amplifier circuit 55 of conventional form, coupled to inductance 53 and arranged as shown. The relay switch 30 takes the output of amplifier 55.

In some cases it is desired to control a switch according to the combined influence of two independent variable conditions; for example humidity and temperature. Fig. 6 shows by way of illustration a compound condition-responsive device for accomplishing this result. As shown, two shafts, 56 and 57 are mounted in axial alinement for independent rotation on standards 58 and 59. One shaft (57) is actuated by a horse hair 23 as in Figs. 4 and 5, and the other shaft (56) is actuated by a bimetallic thermostat strip 60, as shown. Two opposed condenser plates 125 and 126, are attached to the shafts by two support rods 61 and 62, counterbalanced as at 63 and 64. The condenser plates are the counterpart of plates 25 and 26 of the structure of Figs. 4 and 5, and are connected into the oscillatory control circuit as in Figs. 1 and 2. The functioning of the control circuit is thereby made dependent upon two conditions; humidity and temperature.

In the examples given, the hygrometer controls the capacitance in the neutralizing circuit, but if desired, it can be arranged to control inductance. Such an arrangement is shown in Fig. 7, the hygrometer arm 62 being adapted to move an inductance coil 66 with respect to a fixed inductance coil 67. The variable inductance arrangement of Fig. 7 can be applied to any of the circuits of Figs. 1, 2 and 3. Coil 66 takes the place of coil 46 and coil 67 takes the place of coil 53 (of Fig. 2) as shown, and condenser 25, 26 is of course eliminated. The circuit is otherwise similar to that of Fig. 2. While coil 67 is shown as fixed, it can also be made movable, in an arrangement analogous to that of Fig. 6, so that the circuit will respond to two variables.

Figure 8:
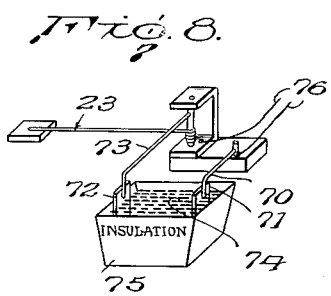
Fig. 8 is a view of a physical condition responsive device adapted to change a resistance or capacitance in the oscillator circuit.

The control circuit can also be arranged to operate by a change in resistance, rather than a change in inductance or capacitance; the hygrometer, etc., being arranged to change a resistance. Such a system is shown in Fig. 8. A fixed conductor arm 70 terminates in a plate 71, opposed to a second terminal plate 72, connected to the hygrometer shaft by an arm 73. The plates are submerged in a conducting liquid 74 such as a salt solution in an insulating container 75. The plates are connected by leads 76 into the neutralizing or regenerating feed-back circuits of Figs. 1, 2 or 3 at any suitable point. Variation in the plate spacing varies the effective resistance of the device of Fig. 8. Conversely the plates may be spaced apart a distance gaged to create a certain desired resistance, then if the resistance be changed by addition to the liquid of any ingredient that will change the resistance value of the resistance liquid, the result will affect the oscillating circuit and the difference indicated between the original and the subsequent effect may be utilized to work a relay switch or the like. In the apparatus of Fig. 8, by substituting a dielectric liquid, e. g. oil, for the electrolyte, the device may be utilized as a variable condenser in controlling the oscillator as described in connection with Figs. 1, 2 and 3.

While the controller has been described as actuated by hygrometers and thermostats, it is applicable to any other form of indicating device which is capable of moving a condenser plate with respect to a fixed condenser plate, or is otherwise capable of varying a capacitance, resistance or inductance.

The transition from an oscillating to a non-oscillating state may be made very abrupt by suitable adjustments of the circuit constants, or if desired, the transition may be made in a more sluggish or gradual manner. Tests have shown that a change in the capacitance of the condenser formed by the plates 25, 26, of as little as $\frac{1}{25}$ of 1 millionth of a microfarad, will cause dependable operation of the relay switch. The controller is thus an extremely sensitive relay.

The indicator (condition-responsive device) and the feed-back controller (e. g. the condenser plates 25 and 26), are conveniently constructed as a unit; for example as in the structure of Figs. 4 and 5. The indicator may have a scale, as in Fig. 4, for registering the change in humidity etc. It is often convenient to assemble the indicator and the oscillating circuit all in a single unit.

Figure 9:
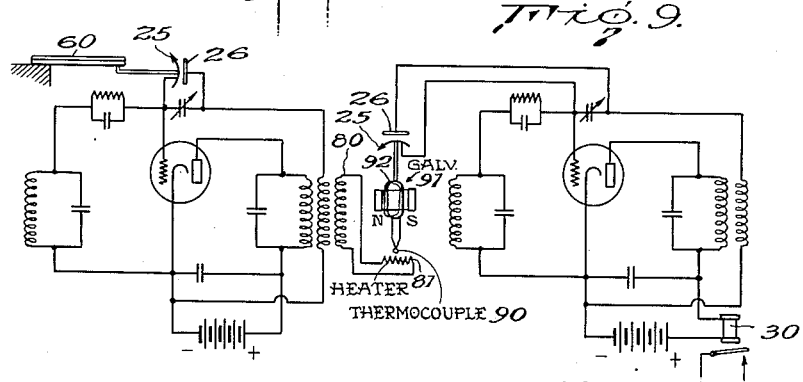
Fig. 9 is a diagrammatic showing of two controllers in tandem arrangement to secure enhanced sensitivity.

While the controllers of Figs. 1, 2 and 3 are capable of high sensitivity, even higher sensitivity can be secured, by a tandem arrangement of two controllers, as shown in Fig. 9. Two controllers are provided, shown as of the type shown in Fig. 2. The left-hand circuit is actuated by a thermostat 60 arranged to move condenser plate 25 and the output energy of the circuit is applied, through a coupling coil 80, to a heater resistor 81, arranged to heat a thermocouple 90 connected to a sensitive milliameter-type galvanometer 91, the moving coil 92 of which is arranged to adjust movable plate 25 of condenser 25, 26 of the second unit. In operation, the first thermostat 60 trips the first oscillator circuit, and the resulting change in heat emission of resistor 81 trips the second oscillator. In a working embodiment, a controller of the type shown in Fig. 9, embodied in a thermostatically controlled heater, has maintained the temperature constant within a range of only ±0.005 degree centigrade; a considerable sensitivity. It will be noted that the system of Fig. 9 makes use of the radio frequency component of the output of the first oscillator.

Figure 10:
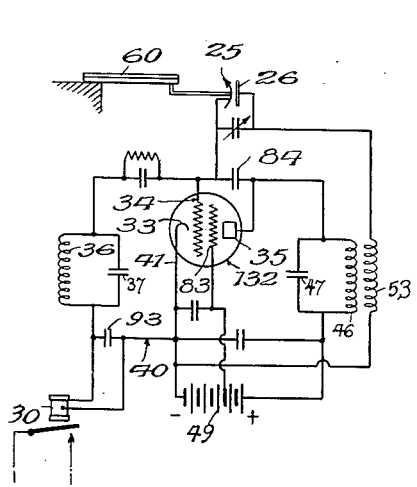
Fig. 10 is a diagram illustrating control of a relay switch by current flowing in the grid circuit of the oscillator.

As stated, if desired the energy for operating the relay switch, etc. can be taken from the oscillator grid circuit or cathode circuit rather than from the plate circuit. Ordinarily, the switch is operated by plate current, as this is the strongest current, but sometimes for reasons of convenience it is desirable to use grid or cathode circuit currents, and Fig. 10 shows one suitable arrangement. The Fig. 10 system is essentially that of Fig. 2, with switch 30 inserted in the grid return lead 40 instead of in the plate lead. A bypass condenser 93 is connected in parallel across the switch. Relay 30 with its bypass condenser 93 can also be connected into the cathode lead 41 if desired. Fig. 10 also illustrates how the oscillator is modified when a screen grid tube is used in lieu of a triode tube. Screen grid tubes have a negligible plate-to-grid capacitance. The tube 132 of Fig. 10 contains a screen grid 83, and a condenser 84 is connected across grid 34 and plate 35 to provide an artificial plate-to-grid capacitance for regenerative feed-back.

Figure 11:
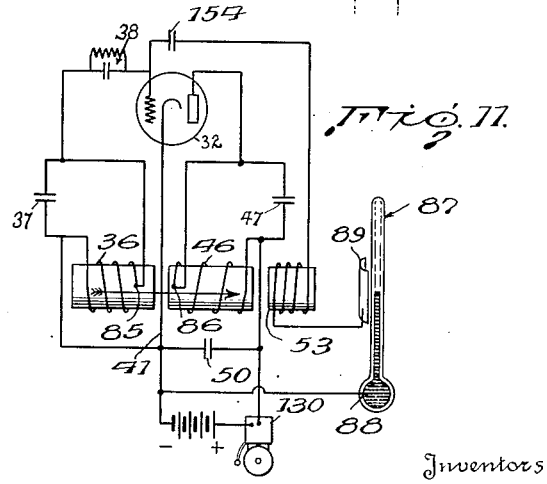
Fig. 11 is a diagram illustrating a particularly advantageous way of coupling the plate and grid circuits of an oscillator, for neutralization, and also illustrating the adaptation of the controller to actuation by a mercury thermometer.

It is often convenient to adjust or control the neutralization of the oscillator by means of inductance rather than capacitance. Fig. 11 shows one particularly useful mode of doing this. Fig. 11 is a modification of Fig. 2. Instead of adjusting the neutralization by variable condenser 54 of Fig. 2, condenser 54 is made fixed as at 154 and the coils 36 and 46 of Fig. 2 are put in adjustable inductive relation, as shown in Fig. 11. Coils 36 and 46 are wound in opposite directions, and the inner ends, 85 and 86 respectively, are connected to the grid and the plate, so as to have a minimum of disturbance. The thermometer, shown as a common mercury thermometer 87 with an electrode 88 connected to lead 41, cooperates with a fixed condenser plate 89 to produce a variable capacitance which affects the oscillator exactly as in the case of plates 25 and 26 of Fig. 2. In Fig. 11, the controller is shown applied to a warning bell 130 in lieu of to a switch.

This application is a continuation-in-part of our application Serial No. 2136, filed January 16, 1935, abandoned in favor of the present application.

If desired, in Fig. 2 coil 53 can be used to supply feed-back instead of neutralization. In this arrangement coils 36 and 46 can be placed in such relation to each other that the coupling between them effects neutralization. Variations of capacitance 25—26 will then upset the neutralization and cause oscillation to start at some desired point. (The feed-back circuit includes the grid-plate capacitance within the tube as well as the external circuit of coil 53.)

What we claim is:

1. A control apparatus comprising an oscillator means including a vacuum tube containing a cathode, grid and plate, a tuned circuit connecting the cathode and the grid and a tuned circuit connecting the cathode and the plate, and constructed and arranged for regenerative feed-back of energy from the plate circuit to the grid circuit, a circuit connecting the plate and grid circuits for neutralizing said regenerative feed-back of energy, a variable circuit element electrically coupling the plate circuit with the grid circuit, means responsive to fluctuations in a physical condition and operably connected with said variable element so as to vary it upon fluctuations in the physical condition, whereby to affect the neutralization of the circuit without affecting the tuning thereof so that when the physical condition goes on one side of a predetermined value the oscillator means oscillates and when the physical condition goes on the other side of a predetermined value the oscillator means ceases oscillating, and an electrical translating device connected to the oscillator means and constructed and arranged to be turned on and off by a current flowing in the oscillator means.

2. The control apparatus of claim 1, wherein said regenerative feed-back of energy is supplied through the internal plate-to-grid capacitance of the tube, and said variable element is in said neutralizing circuit.

3. The control apparatus of claim 1, wherein an external circuit connecting the grid circuit and the plate circuit is provided, for said regenerative feed-back, and said neutralizing circuit is fixed, and the variable element is connected into said external regenerative feed-back circuit.

4. The control apparatus of claim 1 wherein said electrical translating device is connected into the plate circuit of the oscillator means for operation by plate current.

5. A control apparatus comprising two unit control apparatus, each as set forth in claim 1, and the electrical translating device of one of the units is operably connected to the fluctuation responsive means of the other unit for actuation of said other unit, whereby enhanced sensitivity is obtained.

6. Control apparatus comprising an oscillator means including a vacuum tube containing a cathode, grid and plate, a fixed tuned circuit connecting the cathode and the grid and a fixed tuned circuit connecting the cathode and the plate, and arranged for regenerative feed-back of energy from the plate circuit to the grid circuit by the inherent plate-to-grid capacitance of the tube, a circuit connecting the plate and grid circuits, for neutralizing said regenerative feed-back of energy, a variable element in said neutralizing circuit, means responsive to fluctuations in a physical condition and operably connected with said variable element so as to vary it upon fluctuations in the physical condition, and an electrical translating device of on-and-off type connected into the plate circuit for operation by plate current.

7. A control apparatus comprising an oscillator means including a vacuum tube containing a cathode, grid and plate, a tuned circuit including an inductor and connecting the cathode to the grid and a tuned circuit including an inductor and connecting the cathode to the plate, the oscillator means being constructed and arranged for regenerative feed-back of energy from the plate circuit to the grid circuit and said grid circuit and plate circuit inductors being in adjustable coupled relation to each other whereby to provide for neutralization of said regenerative feed-back, a variable element electrically coupling the grid circuit and the plate circuit, means responsive to fluctuations in a physical condition and operably connected with said variable element so as to vary it upon fluctuations in the physical condition, whereby to affect the neutralization of the circuit without affecting the tuning thereof, so that when the physical condition goes on one side of a predetermined value the oscillator means oscillates and when the physical condition goes on the other side of a predetermined value the oscillator means ceases oscillating, and an electrical translating device connected to the oscillator and constructed and arranged to be turned on and off by a current flowing in the oscillator means.

8. A control apparatus comprising an oscillator means including a vacuum tube containing a cathode, grid and plate, a tuned circuit of fixed frequency connecting the cathode and the grid and a tuned circuit of fixed frequency connecting the cathode and the plate, and constructed and arranged for regenerative feed-back of energy from the plate circuit to the grid circuit, a circuit connecting the plate and grid circuits for neutralizing said regenerative feed-back of energy, electrical means coupling the plate circuit with the grid circuit, means responsive to fluctuations in a physical condition and constructed and arranged to disturb said coupling means upon a predetermined fluctuation in the physical condition, whereby to affect the neutralization of the circuit, so that when the physical condition goes on one side of a predetermined value the oscillator means oscillates and when the physical condition goes on the other side of a predetermined value the oscillator means ceases oscillating, and an electrical translating device connected to the oscillator and constructed and arranged to be turned on and off by a current flowing in the oscillator means.

JAMES P. CERVENY.
WILLIAM F. PRIEST.